(12) United States Patent
Farahani et al.

(10) Patent No.: US 8,755,923 B2
(45) Date of Patent: Jun. 17, 2014

(54) OPTIMIZATION SYSTEM

(75) Inventors: Akbar Farahani, Novi, MI (US); John R. Shaw, Waterford, MI (US)

(73) Assignees: Engineering Technology Associates, Inc., Troy, MI (US); United States Steel Corporation, Pittsburgh, PA (US)

( * ) Notice: Subject to any disclaimer, the term of this patent is extended or adjusted under 35 U.S.C. 154(b) by 305 days.

(21) Appl. No.: 12/962,629

(22) Filed: Dec. 7, 2010

(65) Prior Publication Data

US 2011/0137443 A1 Jun. 9, 2011

Related U.S. Application Data

(60) Provisional application No. 61/267,254, filed on Dec. 7, 2009.

(51) Int. Cl.
*G06F 19/00* (2011.01)

(52) U.S. Cl.
USPC .......................................................... 700/98

(58) Field of Classification Search
USPC .......................................................... 700/98
See application file for complete search history.

(56) References Cited

U.S. PATENT DOCUMENTS

| | | | |
|---|---|---|---|
| 7,010,472 B1 * | 3/2006 | Vasey-Glandon et al. | 703/6 |
| 7,065,420 B1 | 6/2006 | Philpott et al. | |
| 7,657,416 B1 * | 2/2010 | Subasic et al. | 703/13 |
| 7,756,688 B2 * | 7/2010 | Averill et al. | 703/2 |
| 8,126,684 B2 * | 2/2012 | Goel et al. | 703/1 |
| 8,209,156 B2 * | 6/2012 | Grichnik et al. | 703/2 |
| 2002/0143418 A1 | 10/2002 | Ohara et al. | |
| 2007/0055638 A1 * | 3/2007 | Kaup et al. | 705/400 |
| 2008/0077364 A1 * | 3/2008 | Wakelam et al. | 703/1 |
| 2008/0250182 A1 | 10/2008 | Chao et al. | |
| 2008/0300831 A1 * | 12/2008 | Taggart et al. | 703/1 |
| 2009/0182539 A1 | 7/2009 | Anai et al. | |
| 2010/0058257 A1 * | 3/2010 | Park | 716/2 |
| 2010/0198556 A1 | 8/2010 | Kost | |
| 2010/0274537 A1 * | 10/2010 | Le et al. | 703/1 |
| 2010/0293313 A1 * | 11/2010 | Ferringer et al. | 710/110 |

OTHER PUBLICATIONS

Neal M. Patel, Crashworthiness Design Using Topology Optimization, University of Notre Dame, Jul. 2007.*

* cited by examiner

*Primary Examiner* — Kavita Padmanabhan
*Assistant Examiner* — Patrick Cummins
(74) *Attorney, Agent, or Firm* — Harness, Dickey & Pierce, P.L.C.

(57) ABSTRACT

A method for generating an optimized body structure is provided. A first topology optimization of a first body configuration is performed to generate a second body configuration. A subset of critical body components are identified based on load path values for the second body component and are parameterized. A second optimization is performed. The second optimization includes a low fidelity optimization for the geometry, the gauge and the grade of the critical body components, and a high fidelity optimization for the mass of each of the critical body components to generate an optimized set of critical body components. The optimized set of critical body components are combined with non-critical body components from the second body configuration to generate a final body configuration which is optimized for performance and weight.

12 Claims, 7 Drawing Sheets

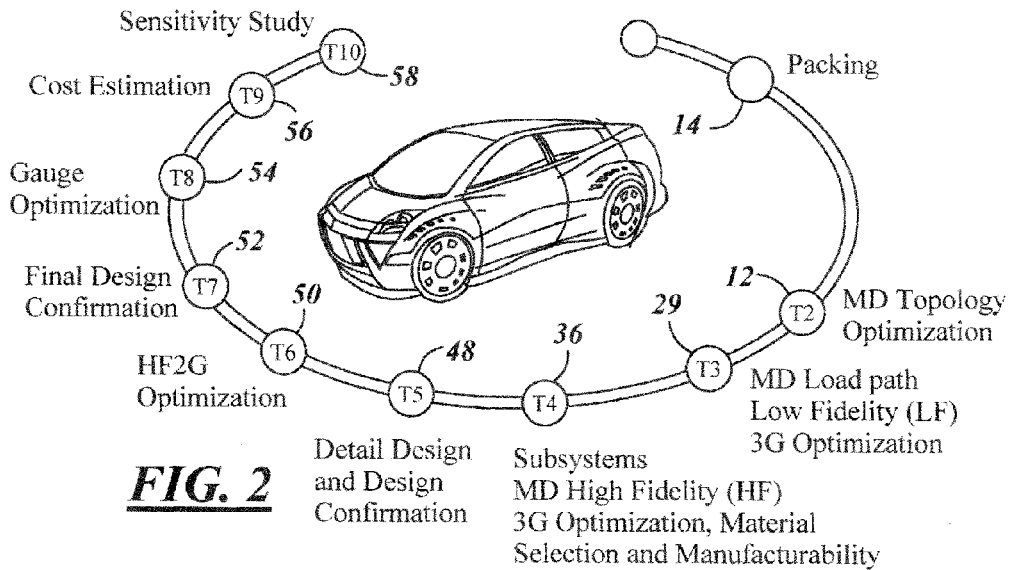
FIG. 2
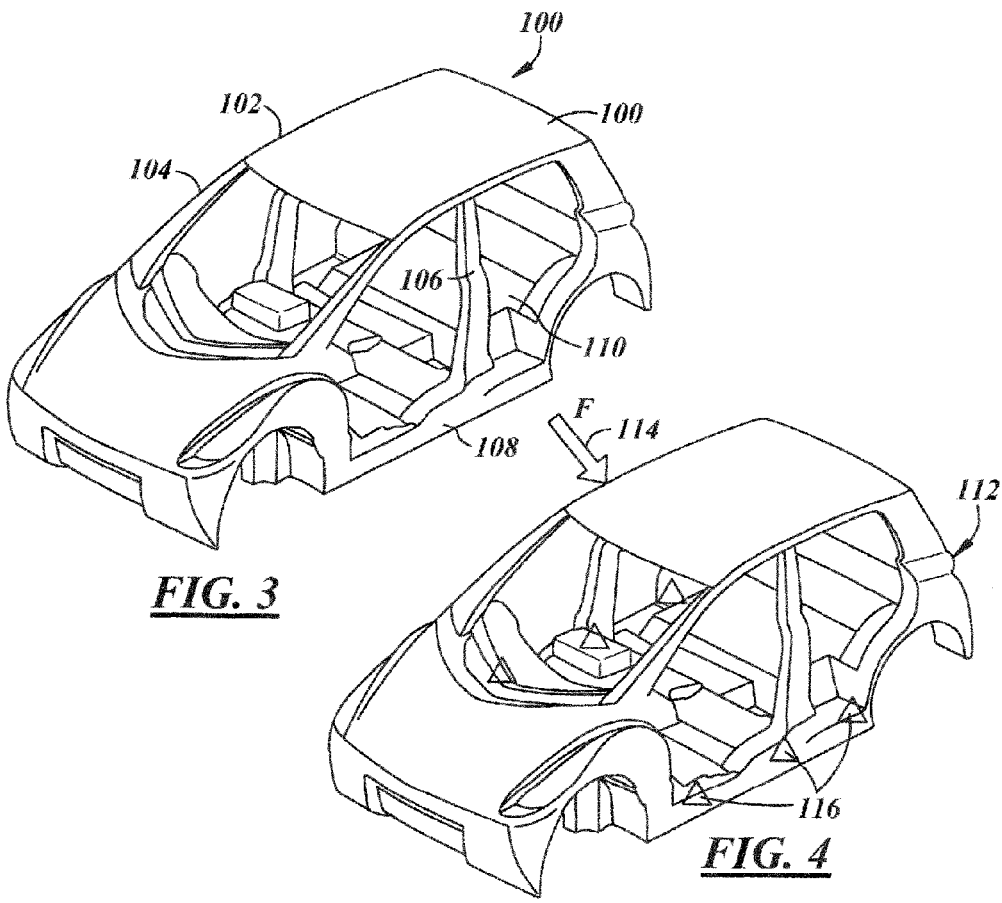
FIG. 3
FIG. 4

OPTIMIZATION SYSTEM

TECHNICAL FIELD

The present invention relates generally to a method and system for generating optimized designs and more particular to a method and system for integrating multi-disciplinary optimization into concept design.

BACKGROUND OF THE INVENTION

The design of complex products commonly requires a large number of steps and processes. Commonly product design begins with artistic concept rendering; moves into computer-aided design or CAD drawings; is analyzed for structural integrity using computer aided engineering; is analyzed for manufacturing feasibility; is reanalyzed for structural integrity; is re-evaluated for design change acceptability. Each step is approached independently often by a different group of specialists. Changes from the designers, changes from manufacturing feasibility, changes from engineering requirements all impact each other and commonly require either reanalysis or accepted inefficiencies.

This is exceedingly prevalent in the design of complex structures such as automobiles. Automotive design must incorporate the artistic vision of the designers; must comply with the realities of CAD representation; must meet or exceed structural limits for a wide variety of loading conditions; and must meet manufacturing feasibility. Each of these priorities tends to pull the resultant design in its own direction. While advances have been made in optimizing the approach for individual design elements, this still requires constant reanalysis in a multitude of areas due to changes for a single design priority.

What has been missing is a truly holistic approach to the design process that integrates the significant arenas of design valuation into a single process in which optimization of the design addresses considerations of each arena. In complex structures such as vehicle design, merely addressing all variables in a single analysis would be virtually untenable with modern processing limitations. Therefore, a more tailored intelligent and holistic approach toward complex structural design is needed. This new approach would allow for improvements in strength to be combined with improvements in weight in addition to improvements in manufacturing feasibility. These multi-disciple considerations could be approached together such that entire design process is optimized as well as the resultant product.

SUMMARY OF THE INVENTION

In accordance with the objects of the present invention, a method of complex product design is provided. The method defines a product design space a base design analysis model is then automatically generated within the product design space. A topology optimization of the base design analysis model is performed including solving the topology optimization for multiple mass fractions to identify critical structure areas. The results of the topology optimizations are utilized to identify a plurality of load paths. An optimization of said plurality of load paths is performed to find the optimized load paths. Critical structure areas along the plurality of optimized load paths are then parameterized. An optimization is performed utilizing a multi-disciplinary to optimize geometry, material or grade, and thickness or gauge (aka 3G optimization) along the optimized load paths. This unique 3G optimization actually optimizes shape, thickness and material simultaneously for a plurality of loading conditions which are analyzed simultaneously. A manufacturing analysis of the shape optimized structure is performed and the shape optimized structure is modified to comply with manufacture requirements. An optimization is then performed using multi-disciplinary optimization comprising a gauge and grade optimization.

Other objects and features of the present invention will become apparent when viewed in light of the detailed description and preferred embodiment when taken in conjunction with the attached drawings and claims.

BRIEF DESCRIPTION OF THE DRAWINGS

FIG. 2 is an simplified illustration of the design method illustrated in FIG. 1;

FIG. 3 is an illustration of a initial design topology for use in the method illustrated in FIG. 1;

FIG. 4 is an illustration of a base design analysis model for use in the method illustrated in FIG. 1;

DESCRIPTION OF PREFERRED EMBODIMENTS

Referring now to the attached Figures which are various details and descriptions of the present invention. The present invention is directed to a system and method for accelerated concept to product design process. The present invention was developed and intended for the development of automotive designs that are approached and designed from a holistic design optimization process. Although the description and attachments are directed towards the development of automotive body structures, one skilled in the art would be able to apply the methodology to a wide variety of products in light of the present disclosure.

The present invention contemplates the methodology to be capable of being integrated into a single piece of software. In addition, the present invention contemplates a plurality of interactive software programs or modules. Finally, the methodology of the design process alone can be implemented without regard to the software base.

The present invention synchronizes computer aided engineering, product design, and manufacturing processes. The present invention describes a unique way of optimizing these three independent areas together wherein in the past they had been approached independently. As such the present invention reduces the time and cost of product development. In addition, the present methodology can be utilized to reduce the number of product components, reduce the product mass and weight, reduce the cost of manufacturing and tooling, and reduce the number of prototypes necessary before full scale production.

Figure 1:
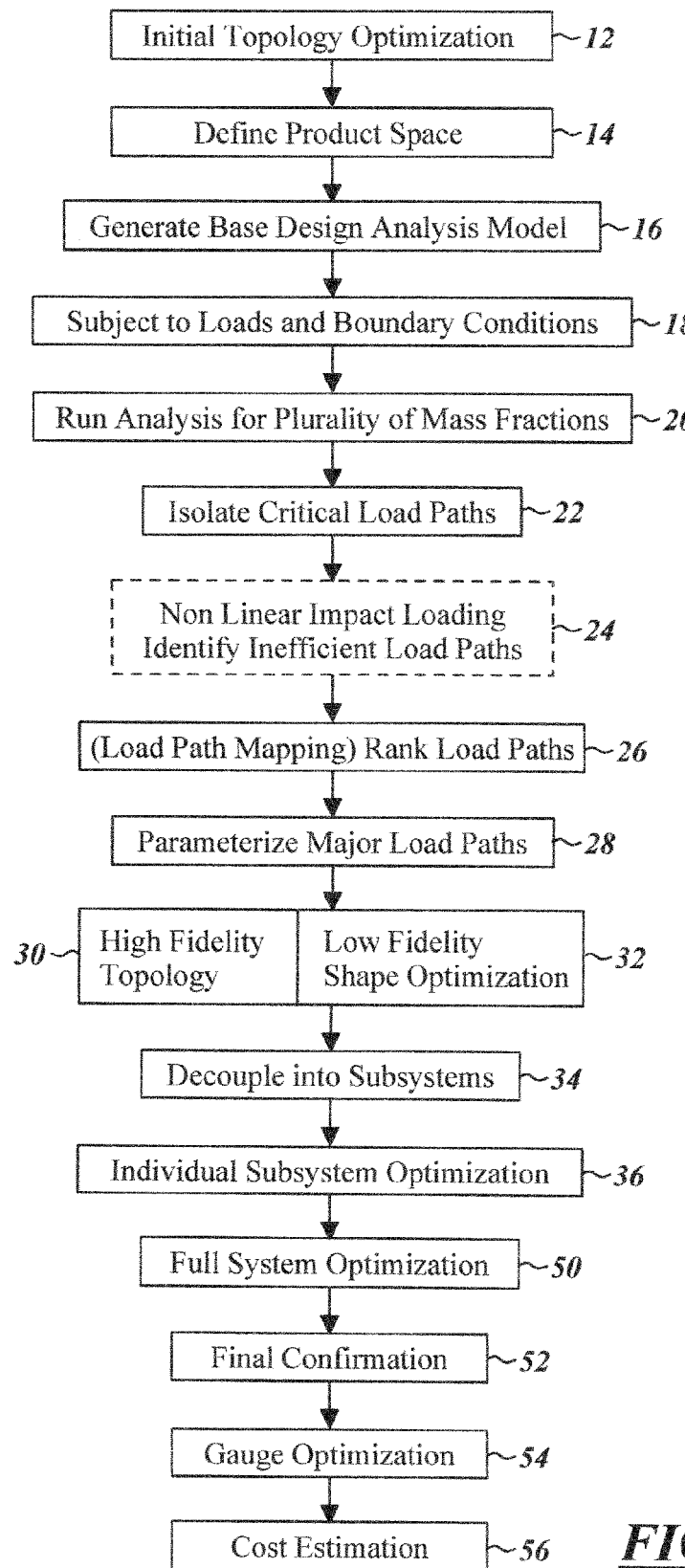
FIG. 1 is a flowchart illustration of a method of design optimization in accordance with the present invention.

Referring now to FIGS. 1 and 2, which are flowchart illustrations of the method of design optimization 10 in accordance with the present invention. The method of design optimization 10 provides a performance-led design solution that efficiently liberates a structure to what its base needs are. The method 10 begins with initial topology optimization 12 wherein a product design space 100 is defined 14. This is defined by the user to encompass the basic shape of the product structural shape. In one example, it is contemplated that this basic shape would comprise the basic outline of a body in white for a vehicle 101 (see FIG. 3). The product design space 100 defines the area within which the structure of the product must exist. In one embodiment it is contemplated that the product design space 100 may be directly defined by user. In other embodiments, it is contemplated that the design space 100 may be interpolated from CAD data as would be understood by one skilled in the art in light of the present application.

A base design analysis model 112 is generated 16 to till the product design space 100 (FIG. 4). In one embodiment the base design analysis model 112 may be automatically generated by a software engine. In another embodiment it can be user generated. It is further contemplated that large complex structures may be broken up into a plurality of individual components with live boundary conditions at adjoining ends. For the example of the body in white, these component may include elements like roof rails 102, A 104 and B pillars 106, rocker 108, and floor bulkheads 110 to name only a few.

The initial base design analysis model is then subjected to a plurality of load cases 114 and corresponding boundary conditions 116 in a computer aided engineering analysis 18. The present invention contemplates both linear static and dynamic load cases. In one embodiment centered on automotive design, the present invention contemplates load cases that include loading situations such as front crash, rear impact, side impact, pole impact, roof crush, torsion and bending. Each of the load cases will have its own boundary constraints as would be understood by one skilled in the art. It is contemplated that the loading cases can be selected from a group of pre-defined conditions or may be individually entered by an end user. In one embodiment, it is contemplate that the initial load cases be limited to linear static loadings. It is contemplated, however, that initial dynamic loading cases can be approximated by static loadings. The present invention, however, does contemplate the use of dynamic loadings where practical.

Figure 5:
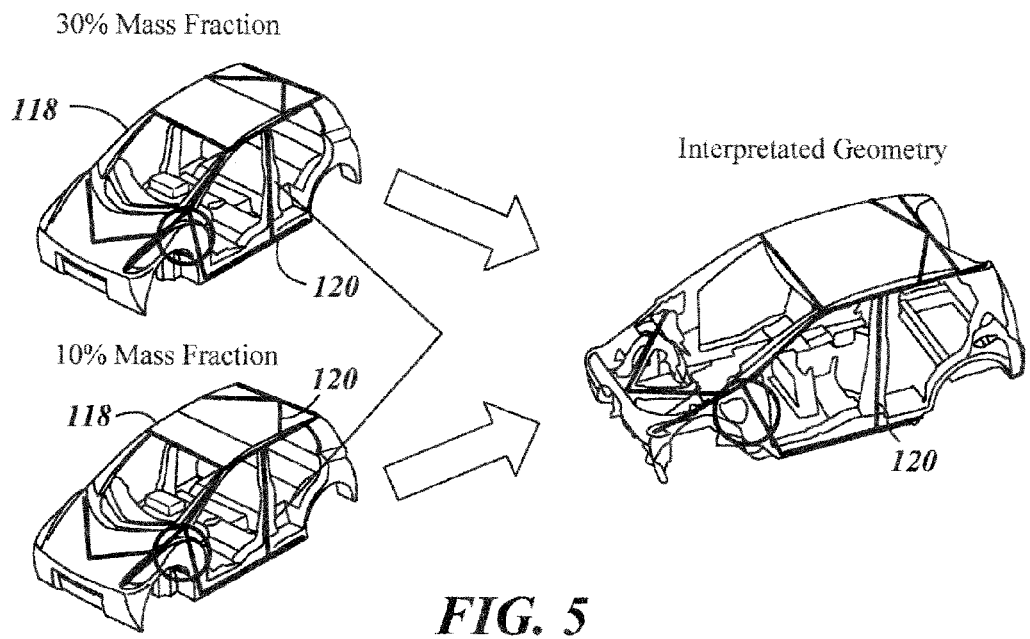
FIG. 5 is an illustration of the use of mass fraction analysis to isolate critical load paths in accordance with the method in FIG. 1.

The initial base design analysis model in most situations contains far too many variables to be optimized by brute force calculation. Therefore, the present invention contemplates a novel approach towards limiting the variables in question to allow for practical and efficient optimization. The present invention utilizes mass fraction analysis 20, i.e. running the engineering analysis 18 for a plurality of mass fractions, to generate an initial skeleton indicating major load paths. The engineering analysis is solved for a plurality of mass fractions (such as 30%, 20%, and 10%). As the mass is reduced a plurality of critical load structures 118 are identified (FIG. 5). As the mass of the model is reduced, the structure that is critical for load transmission will be easily identified and this critical structure is indicative of major load paths 120. The present invention thereby isolates major (critical) load paths 22. In addition, when multiple load cases are utilized additional critical load paths will be identified for varying loading conditions.

Although the present invention could merely utilize the major load paths 120 identified above, it is further contemplated that the initial base design analysis model can be further improved by subjecting the model to non-linear impact loading conditions 24 as a second step. This allows the analysis to determine additional critical (major) load paths 120 and identify inefficient load paths. In this fashion the initial topology can be optimized with a low fidelity optimization wherein a plurality of optimal load paths are determined.

Figure 6:
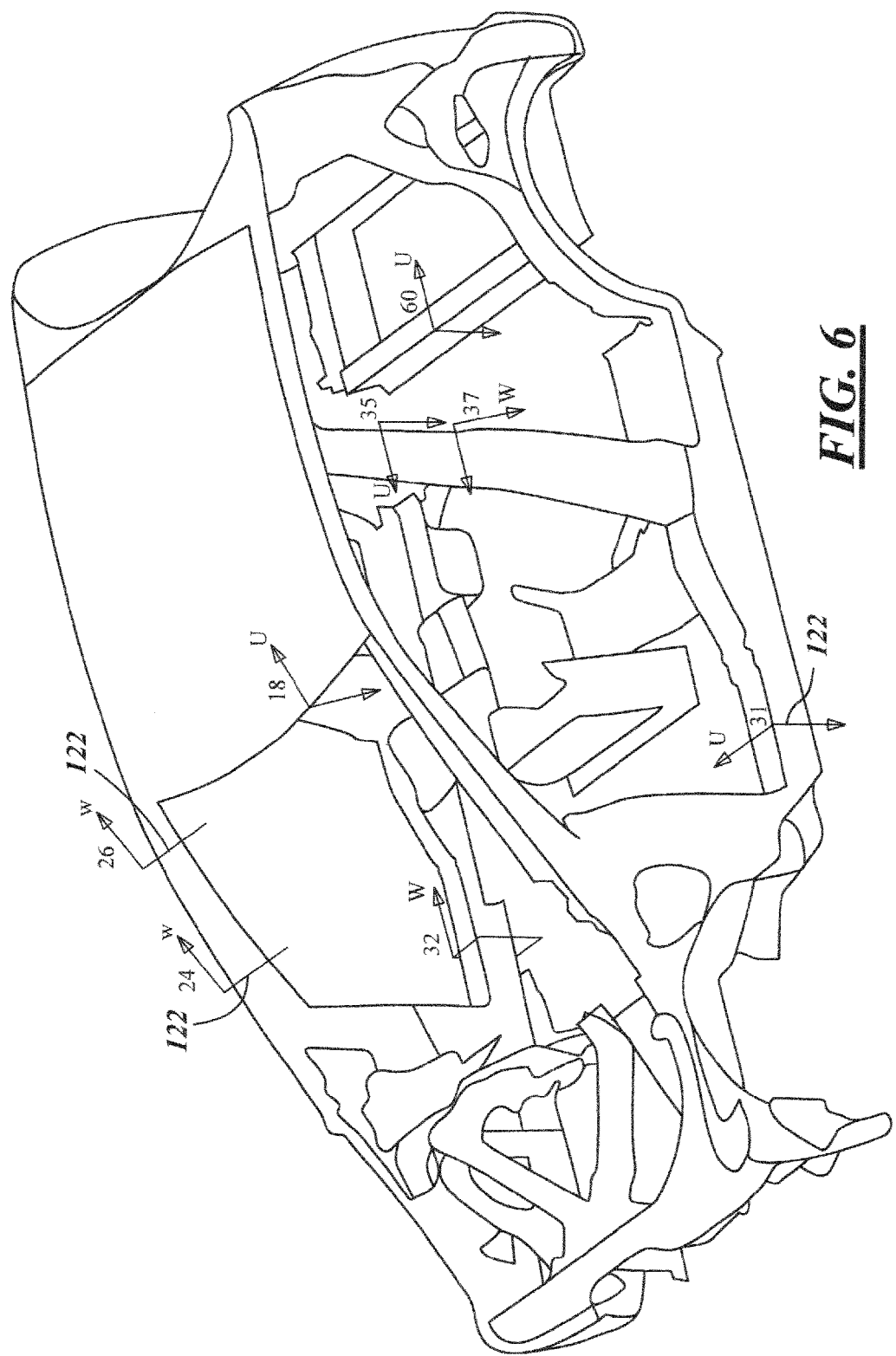
FIG. 6 is an illustration showing cross-sections through the base design analysis model as part of the load path ranking in accordance with the method in FIG. 1.
Figure 7:
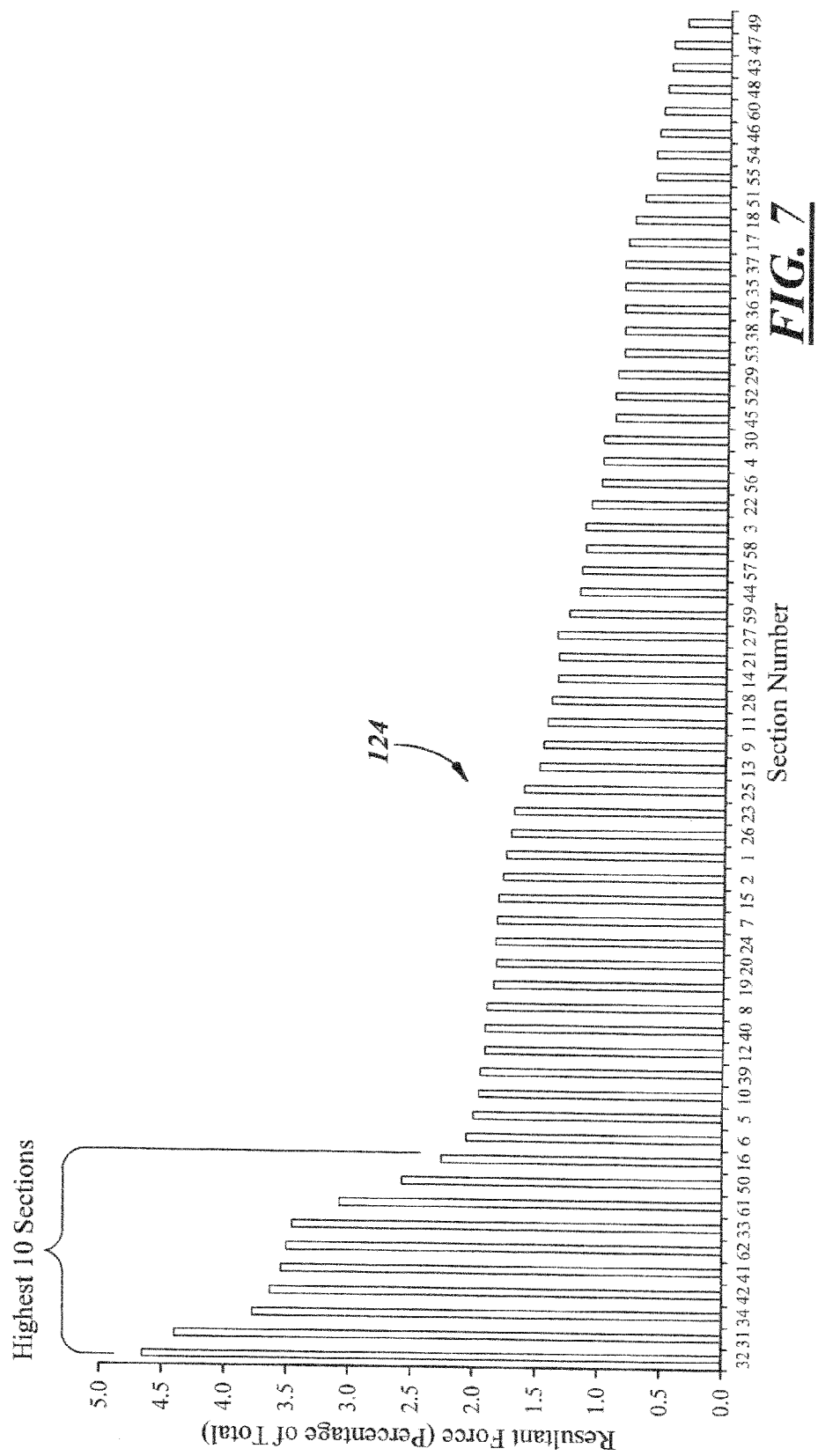
FIG. 7 is an illustration of identification of section forces as part of the load path ranking in accordance with the method in FIG. 1.
Figure 8:
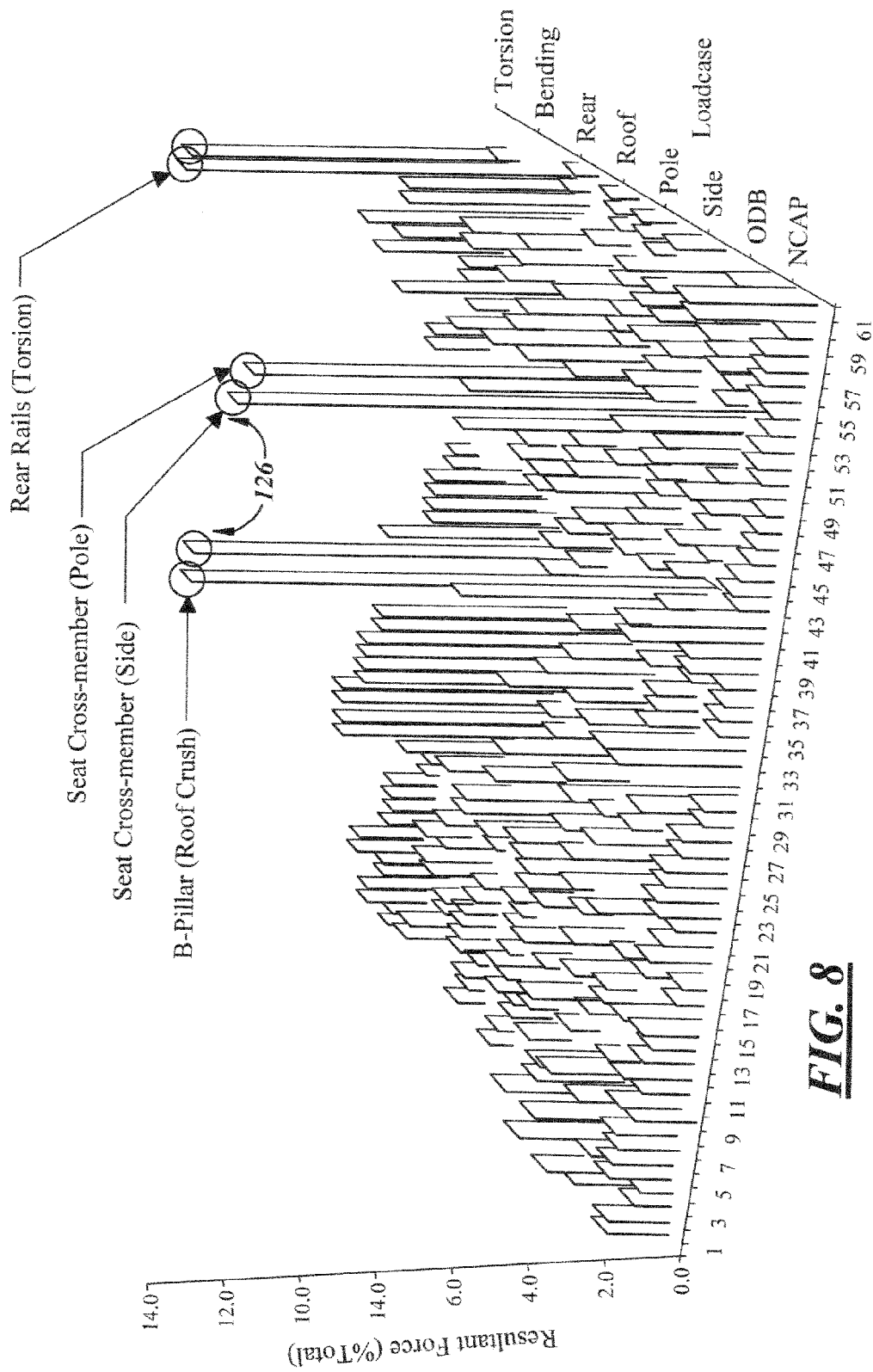
FIG. 8 is an illustration of identification of the most active load paths as part of the load path ranking in accordance with the method in FIG. 1.

Following the identification of the plurality of critical load paths 22, the present invention moves on to load path mapping 26. In load path mapping the present invention ranks the load path activity. This is accomplished by defining cross-sections 122 (see FIG. 6) throughout the initial base design analysis model. The critical load paths are utilized to identify section forces 124 within the cross-sections for each of the load cases (FIG. 7). The section forces are then ranked to identify the most active load paths 126 (FIG. 8). The present invention identifies the load paths with the highest percentage of loads. By ranking these load paths the present invention can provide an efficient allocation of design variables for optimization. The design variables are parameterized 28 along only the major (most active) load paths 126.

Figure 9:
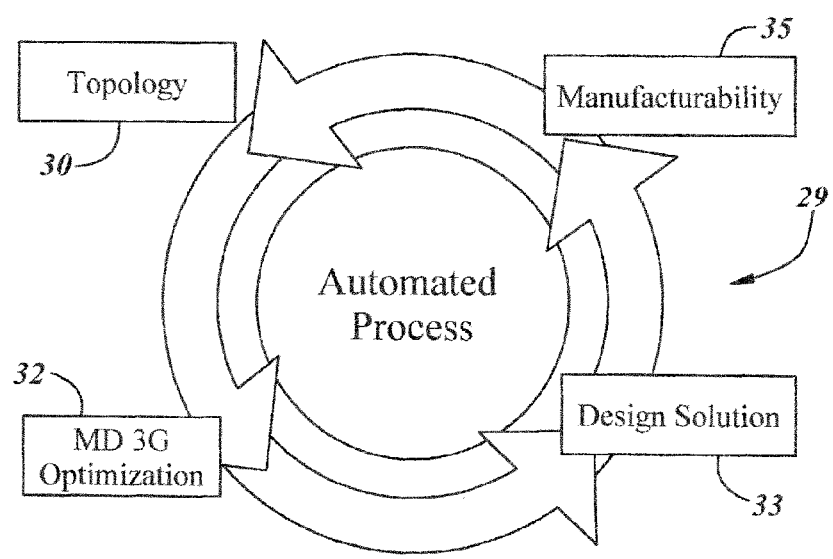
FIG. 9 is an illustration of a first optimization routine in accordance with the method shown in FIG. 1.
Figure 10:
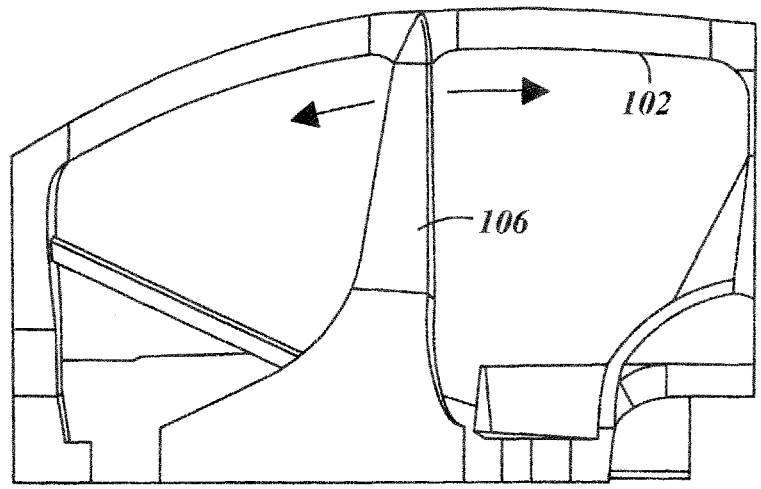
FIG. 10 is a detailed illustration illustrating topological optimization in accordance with the method shown in FIG. 1.

The present invention now has a parameterized model that can be efficiently and reasonably optimized. The present invention approaches this through the use of a first multi-faceted (disciplinary) optimization routine 29 illustrated in FIG. 9. The routine 29 includes a high fidelity topology optimization 30 allows the position of the critical load paths 126, and hence the critical load structures, to be moved within the product design space 100 such that their location is optimized. It should be understood that the terms "high fidelity" and "low fidelity" correspond to the allocation of available parameters during optimization with "high fidelity" allocating more than 50% while low-fidelity allocating less than 50%. Thus in the described situation high fidelity topology optimization is allocated 75% of available parameters while the low fidelity shaping below is allocated 25%. For example, the intersection of the B-pillar 106 is moved forward and rearward along the roof rail 102 until the most efficient position within design considerations if found (FIG. 10). Additionally, a low fidelity shape optimization 32 is performed. The low fidelity shape optimization 32 includes the simultaneous optimization of geometry, gauge, grade (3G optimization). It should be understood that the multi-disciplinary 3G contemplates optimizing geometry, gauge, and grade simultaneously under multiple loading conditions at the same time. Thus the cross-sectional profile, thickness and type of material are all optimized together for multiple loading conditions in a single optimization loop. Although it is contemplated that grade may simply refer to a single family of materials, such as steel, it is also contemplated that the term grade may refer to a variety of different materials. These may include, but are not limited to, composites, ceramics, metals, plastics, etc. The resultant design solution 33 is evaluated for manufacturability 35, and/or optimized for manufacturability, and the process is repeated until a multi-faceted optimized design is achieved. The present invention utilizes this 3G approach wherein not only the size and grade of individual components are altered, but also there relative position. For example, not only the cross-section and material of the B-pillar 106 is optimized, but the position of the B-pillar 106 relative to the roof rail 102 is also optimized. Furthermore, the low fidelity shape optimization is also achieved by way of modifying cross-sectional size and material. This allows the development of an optimized design along the critical load paths while also allowing for weight savings.

Figure 11:
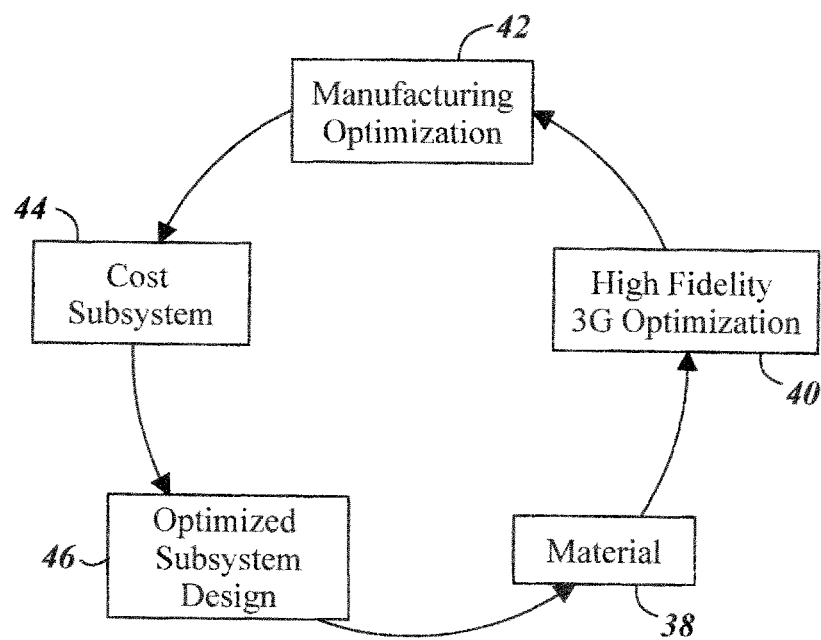
FIG. 11 is an illustration of the sub-system optimization routine in accordance with the method shown in FIG. 1.

After the first multi-faceted optimization routine 29 is performed, the present invention contemplates decoupling 34 the resultant optimized design into a plurality of subsystems, i.e. separating out the roof rails 102, B-pillars 106 etc. to be each independently optimized. Each subsystem will be designed based on the recommendations provided by the first multi-faceted optimization procedure 29. The present invention contemplates performing a subsystem optimization routine 36 (FIG. 11) wherein one or more materials 38 will be evaluated and the subsystem will be run through a high fidelity 3G (geometry, gauge, and grade) optimization 40, a manufacturing optimization 42 process, and an automated cost estimation 44. In this unique 3G optimization 40 it is contemplated that closer to 100% of the parameters will be dedicated to optimizing geometry, gauge, and grade simultaneously. It is contemplated that the manufacturing optimization process 42 not only evaluates the geometry but modifies it to conform with available manufacturing processes. In addition, the cost estimation 44 process preferably estimates the cost of both the material, the cost associated with resultant weight, as well as the associated manufacturing processes associated with the use of such material. The result of this optimization step 29 is an optimized subsystem component 46. In is contemplated that once the subsystems are optimized for manufacturing, the model can be resubmitted through the load path optimization analysis. In this fashion, a product can be taken from concept to a point wherein it has been optimized for both strength and manufacturing simultaneously.

The present invention then contemplates adding the subsystems to the main structure 48 and performing a full system optimization 50. Although the prior methods can be applied to the full system as discussed, one embodiment contemplates running the full system through a low fidelity geometry and high fidelity 2G (gauge and grade) optimization in methods as previously described. It is contemplated that a final design confirmation 52 is included comprising submitting the engineering design concept to the product designers for confirmation of acceptability. The designers then have the opportunity to not only approve or disapprove of the resulting engineering design concepts but are additional provided the opportunity to provide additional design detail to the engineering design concept model. While this detail may compromise minor modifications of existing structure, it is also contemplated to encompass the addition of additional undefined structural mass elements. In the case of an automotive design these additional elements could include items such as the vehicle engine, the vehicle chassis, or even vehicle suspension elements.

The present invention then contemplates the performance of a mass compounding check in combination with a gauge optimization 54. This provides several benefits. The additional details added by designers can be cleaned up. In addition, the mass compounding check allows for a significant reduction in unnecessary weight. This is highly desirable in vehicle design as resultant weight has significant impacts on vehicle efficiency. Once the gauge optimization has been performed, the present invention preferably includes a process for confirming the final design. The final vehicle design is subjected to the required load cases to confirm that it meets all the design requirements.

The present invention contemplates utilizing the material, weight, and manufacturing results for each subsystem as well as the overall vehicle to provide a cost estimation 56 representative of vehicle production. It is contemplated that a cost database could be developed such that cost variations based on location or fluctuations in material costs could be quickly accommodated. The cost estimation 56 may additionally be merely relative cost savings based on various materials and manufacturing options.

Finally, the present invention contemplates submitting the final design to a sensitivity study wherein existing design variables are run to evaluate the robust nature of the design 58. By way of example, items such as seat position can be varied and the impact of their changes can be evaluated relative to their impact on the resulting design requirements. This further allows for a more robust design that is capable of evaluating and optimizing a design concept and bringing it to the point of production modeling in an efficient coordinated manner.

The present invention provides a unique full system optimization that provides unique cost savings to users. The present approach saves labor costs, reduces the number of parts, optimizes tooling, reduces material costs and provides significant savings in development time. The present invention introduces unique 3G optimization which allows the optimization routines to change geometry, gauge, and grade at the same time. This allows for a more efficient and reliable optimization.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A computer-implemented method for generating a body structure comprising:

defining a product design having a geometry for a plurality of body components, and a load set having multiple load cases;

assigning a spatial orientation within the product design, a material property and a mechanical property to each of the plurality of body components and generating a first body configuration;

performing a first topology optimization in a first processor using the first body configuration, a constraint set defining a boundary condition for the first body configuration and at least one of (i) the load set and (ii) a mass fraction set to compute a load path value for each of the plurality of body components and generating a second body configuration;

ranking each of the load path values and separating the second body configuration into a subset of critical body components and a subset of non-critical body components, wherein a critical body component has a load path value above a threshold value;

assigning a set of parametric design variables including a spatial location, a geometry, a gauge and a grade to each of the critical body components based on the load path values therefor;

performing a second optimization in a second processor using the subset of critical body components, a constraint set defining a boundary condition for the subset of critical body components and the load set to generate an optimized subset of critical body components, wherein the second optimization includes:

(a) performing a low fidelity optimization for the geometry, the gauge and the grade of the critical body components to define a cross-sectional profile, a thickness and a material type for each of the critical body components and for the spatial location of the critical body components to define an initial location for each of the critical body components for an initial optimized subset of critical body components, wherein the geometry, gauge, grade and initial location are simultaneously optimized for at least one performance variable;

(b) performing a high fidelity optimization for the mass of each of the critical body components while maintaining the at least one performance variable to define a final optimized subset of body components; and (c) generating a first datafile including computer aided design data and a bill of materials for the final optimized subset of body components;

combining the final optimized subset of critical body components with the subset of non-critical body components and generating a final body configuration, wherein the subset of critical body components have been optimized for performance and weight; and generating a second datafile including computer aided data and a bill of materials for the final body configuration.

2. The method of claim 1 further comprising separating the first body configuration into a plurality of body subsystems, performing the first topology optimization on each of the plurality of body subsystems and generating the second body configuration therefrom.

3. The method of claim 1 further comprising defining a manufacturing cost requirement, analyzing the optimized subset of critical body components to determine a manufacturing cost therefor, and modifying the optimized subset of critical body components to meet the manufacturing cost requirement.

4. The method of claim 1 wherein the second optimization further comprises defining a set of manufacturing constraints, performing the high fidelity optimization of the subset of critical body components for each of the manufacturing constraints to determine a manufacturing cost associated with each manufacturing constraint, and selecting a manufacturing solution based on the manufacturing cost, wherein the subset of critical body components have been optimized for manufacturing cost.

5. The method of claim 4 wherein the set of manufacturing constraints comprises a plurality of manufacturing processes.

6. The method for generating a body structure of claim 4 wherein the set of manufacturing constraints comprises a plurality of material costs.

7. The method of claim 1 wherein the multiple load cases comprise at least one linear static load case and at least one dynamic load case.

8. The method of claim 1 wherein the multiple load cases are selected from the group consisting of a bending load, a torsion load, a front crash load, a rear impact load, a side impact load, a pole impact load, and a roof crush load.

9. The method of claim 1 further comprising performing a third optimization in a third processor using the final body configuration, the constraint set defining a boundary condition for the final body configuration and the load set to generate an optimized final body configuration, wherein the third optimization includes:

(a) performing a low fidelity optimization for the gauge and the grade of the final body configuration to define a thickness and a material type for the final body configuration, wherein the gauge and grade are simultaneously optimized for at least one performance variable;

(b) performing a high fidelity optimization for the gauge and the grade of the final body configuration to define a thickness and a material type therefor, wherein the gauge and grade are simultaneously optimized for at least one performance variable; and (c) generating a third datafile including computer aided design data and a bill of materials for the optimized final body configuration;

wherein the optimized final body configuration has been optimized for performance and weight.

10. The method of claim 1 further comprising fabricating a body structure from the final body configuration.

11. The method of claim 1 further comprising performing the first topology optimization and the second optimization on a computer aided engineering system having the first and second processor.

12. The method of claim 9 further comprising performing the first topology optimization, the second optimization and the third optimization on a computer aided engineering system having the first processor, the second processor and the third processor.

* * * * *